Jan. 11, 1938.  E. W. BOYER  2,105,401
NUT LOCK
Filed May 1, 1935  2 Sheets-Sheet 1
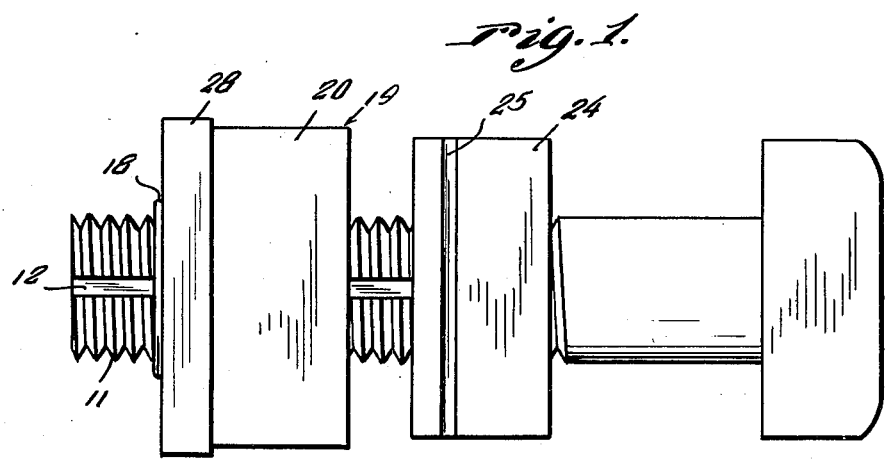
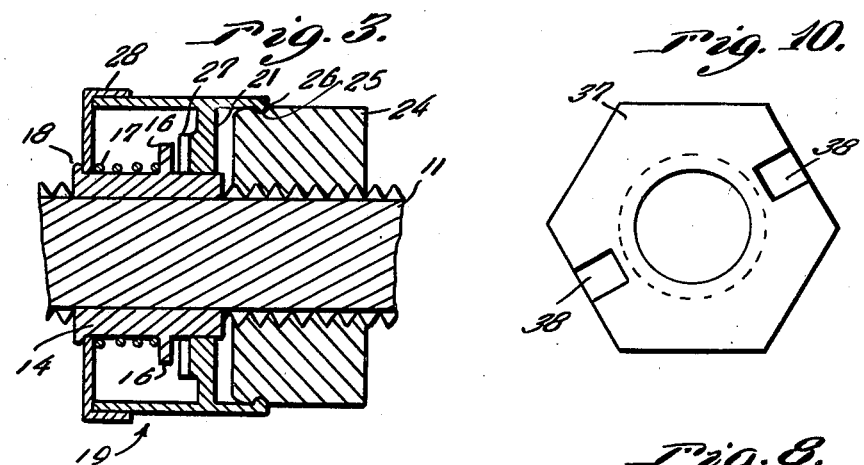
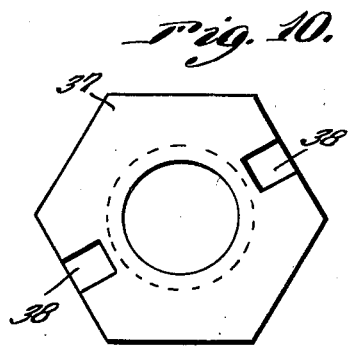
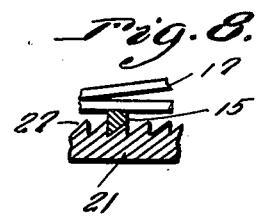
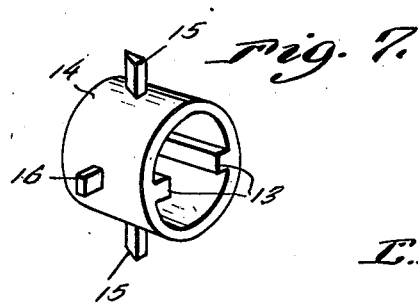
Inventor
E. W. Boyer
By Clarence A. O'Brien
Attorney Jan. 11, 1938. E. W. BOYER 2,105,401
NUT LOCK
Filed May 1, 1935 2 Sheets-Sheet 2
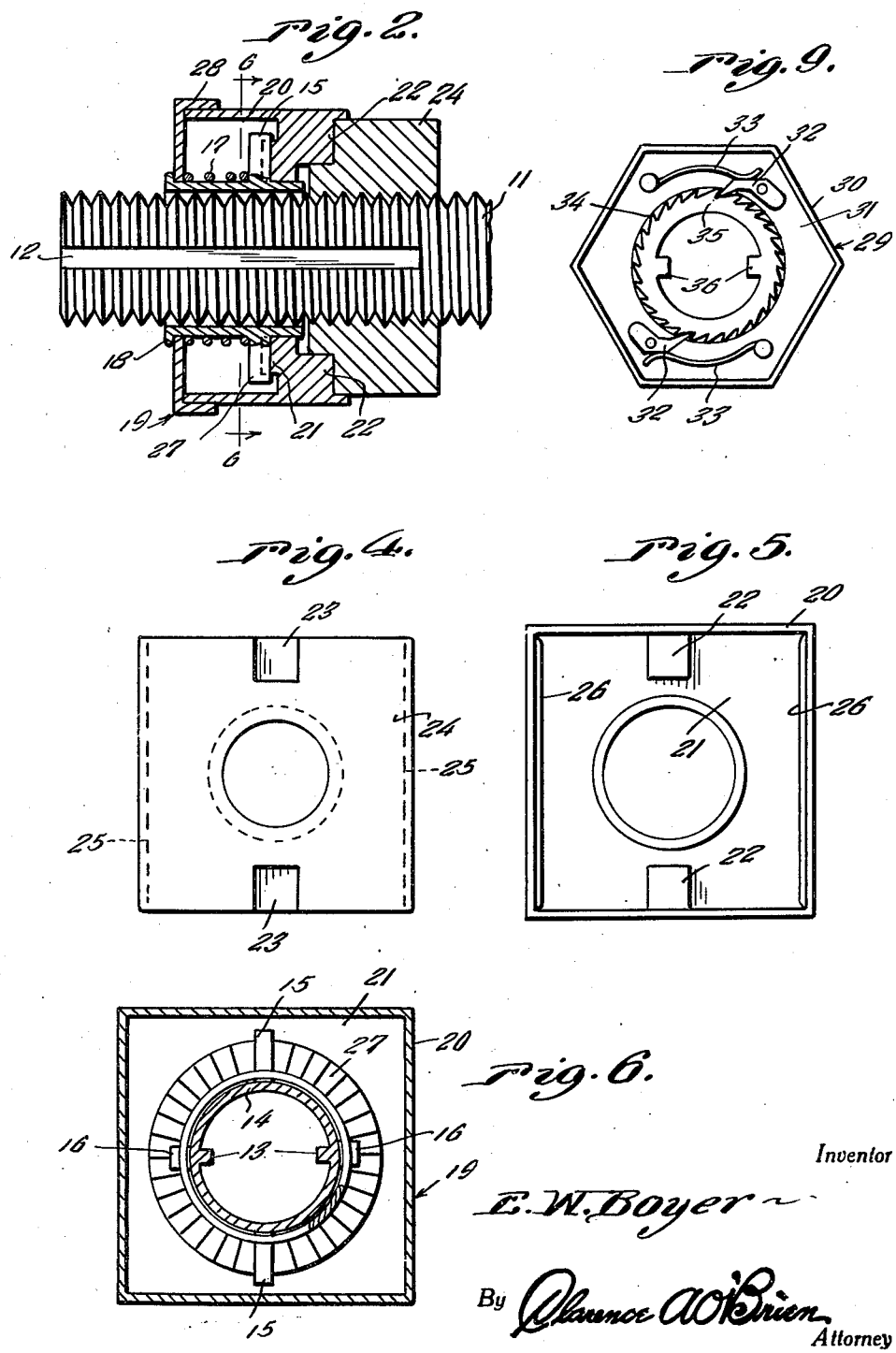
Inventor
E. W. Boyer
By Clarence A. O'Brien
Attorney Patented Jan. 11, 1938

2,105,401

UNITED STATES PATENT OFFICE 2,105,401

NUT LOCK

Earl William Boyer, Pottsville, Pa.

Application May 1, 1935, Serial No. 19,291

3 Claims. (Cl. 151—10)

This invention relates to that class of appliances and structures and now generally referred to in the trade and the art as nut locks and it has more specific reference to the type wherein an especially constructed nut is used in conjunction with a grooved bolt and coacting means is provided between the nut and bolt to permit the nut to be tightened to the requisite degree but to prevent retrograde rotation and possible accidental displacement.

In accordance with the present invention I have provided a novel and improved assemblage wherein the nut is modified in contrast to a conventional one to include a plurality of keeper seats expressly designed and positioned for adequate and satisfactory coaction with a slidable but non-rotatable clutch equipped locking unit.

The principal novelty, structurally speaking, resides in the adoption and special adaptation of the slidable, easily removable, non-rotatable locking unit, this being characterized by a casing rotatably mounted on a locking or anchoring sleeve, spring pressed clutch means being embodied in the casing and sleeve assemblage to provide the desired and compensating properties and to at the same time afford the desired nut locking facilities.

My general aim is to improve upon prior art structures with which I am familiar by providing an arrangement regarded as a distinct improvement in that it embodies a special selection and coordination of parts calculated to promote efficiency and dependability and to thus provide the trade with a device which, it is believed, is more suitable and aptly fitted for the purposes intended.

In the accompanying drawings wherein like numerals are employed to designate like parts throughout the views:

Figure 1 is an elevational view of a bolt and nut constructed in accordance with the principles of the present invention showing the improved locking device on the bolt separated from the nut.

Figure 2 is a sectional view, partly in elevation showing the manner in which the complemental features are constructed and correlated for nut locking purposes.

Figure 3 is a view similar to Figure 2, the section being taken substantially at right angles to disclose the complete cross sectional construction and jointing connection between the parts.

Figure 4 is a face view of the especially designed nut.

Figure 5 is an end view of the rotary casing part of the nut locking unit showing the special cast or formation thereof.

Figure 6 is a section taken approximately on the plane of the line 6—6 of Figure 2 with the bolt removed.

Figure 7 is a perspective illustration of the double ribbed slidable but non-rotatable sleeve.

Figure 8 is a detail sectional view showing the special coaction between the spring pressed ratchet tooth and cooperable rack teeth.

Figure 9 is a view showing a slightly different embodiment wherein the clutch teeth are formed on the sleeve and the companion casing is provided with spring pressed locking pawls.

Figure 10 is a view showing a hexagonal rather than a square nut.

By way of introduction to the detailed numerically distinguished explanation it is to be pointed out that the features will be made of appropriate materials and will be of proper relative proportion since the idea is applicable to either small or large bolt and nut assemblies.

Attention is first invited to the structure disclosed in Figures 1 to 8 inclusive. Here the bolt is denoted by the numeral 11 and is conventional with the exception of the provision of longitudinally disposed diametrically opposed grooves 12 employed to receive the complemental keys or ribs 13 on the slidable non-rotatable sleeve 14. This sleeve, which is in effect an anchoring bushing is fitted over the threads on the bolt and the keys 13 are slidably fitted in the keyways or grooves 12. Further considering the sleeve it will be noted that it is provided with equi-distant circumferentially spaced elements, one pair of which are shaped to provide tapered clutch teeth 15. The remaining lugs 16 function as abutments to accommodate an adjacent end coil of the coil spring 17 which surrounds the sleeve. Incidentally, the sleeve is formed at its outer end with an annular retaining bead 18. This sleeve and its features constitute an important part of the locking unit 19. The locking unit comprises a substantially rectangular sheet metal casing 20 which is formed with a web or diaphragm 21 having a central opening which serves to accommodate the adjacent end portion of the sleeve in such a way that the sleeve is assembled to rotate thereon. That is to say, this extended end portion of the sleeve serves as a sort of bearing or bushing. At opposed points the diaphragm is formed with block-like enlargements 22 which may be said to be keepers and these fit into keeper notches or seats 23 formed in the adjacent face of the nut 24. The nut is also formed on opposite sides with shallow grooves 25 which constitute additional keepers for reception of the complemental retention ribs 26 on opposite walls of the casing. It is evident therefore that these ribs 26 removably snap into the grooves 25 while the lugs 22 fit removably into the keeper seats 23. The opposite side of the diaphragm or partition is formed with an annular row of rack teeth 27 located to accommodate the clutch teeth 15 on the sleeve, these teeth 15 being forced yieldably into engagement with the teeth 27 through the instrumentality of the spring 17 bearing against the stops or lugs 16. The remaining part of the casing comprises a cap 28 which fits over the outer end of the casing and is held in place by the bead 18. It is evident therefore, that the arrangement comprises essentially a sleeve having keys to fit slidably into keyways in the stem of the bolt, the sleeve having rotatably mounted thereon a casing provided with a diaphragm rotatably surrounding the sleeve and carrying rack teeth with which the teeth 15 yieldably cooperate. This provides a one-way clutch in that it allows the casing to rotate on the sleeve in one direction but prevents its rotation in the opposite direction when the respective teeth are engaged. By preference the spring arrangement is such as to keep said teeth constantly but yieldably engaged. That portion of the shell of the casing which extends beyond the diaphragm 21 is provided with the keeper elements 22 and 26, and these being engageable with the keeper seats 23 and 25 in the nut provide the requisite coordination and connection between the locking device as a unit and the nut. By manual manipulation the features 22 and 26 may be engaged from their complemental features 23 and 25 whereby to allow the nut 24 to rotate freely and to be adjusted to the desired set position. Then by snapping the ribs 26 into the groove 25 and fitting the lugs 22 in the seats 23 this temporarily joins the locking unit to the nut and prevents the nut, through the instrumentality of the spring pressed clutch means from turning in a retrograde direction. Consequently, it cannot become accidentally displaced. It is evident, however, that the clutch or locking unit is bodily separable from the nut and bodily removable from the grooved portion of the stem of the bolt.

The same idea is carried into effect in Figures 9 and 10 wherein a hexagonal arrangement is utilized. Here the locking unit may be differentiated by the numeral 29 and comprises a casing 30 whose partition 31 is provided with pivoted pawls or latches 32 held by springs 33 against the ratchet teeth 34 formed on the locking sleeve 35. The sleeve is provided as is usual with the keys or ribs 36. The nut 37 shown in Figure 10 is again provided with keeper notches 38 to accommodate the complemental keeper lugs (not shown). Generically it is evident that here again we have a key equipped sleeve slidably mounted on the grooved bolt and a casing unit rotatable in one direction on the sleeve but held against rotation in the opposite direction by the pawl and ratchet means which is equivalent, broadly stated, to the aforementioned clutch means. Or stated otherwise, the "clutch means" is intended to comprehend both arrangements whether it be a spring pressed tooth and rack construction or a spring pressed pawl and ratchet mechanism.

The gist of the invention, as before stated, resides in the provision of an especially designed keeper equipped nut mounted on a grooved bolt wherein said bolt serves to accommodate a ribbed sleeve and constitutes a carrier or bushing for a rotary casing, there being coacting clutch means between the casing and sleeve to lock the parts against rotation in one direction and coacting means between the casing and nut to temporarily join these parts together.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described the invention, what is claimed as new is:

1. As a new article of manufacture, a bodily slidable locking unit for a nut comprising a sleeve, a casing means for non-rotatably connecting the casing to the nut, said casing having a diaphragm rotatably surrounding one end portion of the sleeve, said diaphragm being provided with rack teeth, said sleeve being provided with teeth engageable with said rack teeth and further provided with retention ribs serving as keys for cooperation with keyways in a complemental bolt.

2. In a structure of the class described, in combination, a bolt, a sleeve slidably but non-rotatably mounted on the bolt, a casing rotatably supported on the sleeve, ratchet means between the sleeve and casing for permitting the casing to rotate in one direction but not in the other direction, a nut threaded on the bolt and having a part fitting in the casing, means for preventing relative rotation between the nut and casing and latch means for detachably connecting the casing with the nut.

3. In a structure of the class described, a sleeve slidably and non-rotatably mounted on a bolt, a casing rotatably arranged on the sleeve, a projection at one end of the sleeve engaged by a part of the casing, a projection on the sleeve, a spring on the sleeve located between the last-mentioned projection and said part of the casing to hold the casing against the first-mentioned projection, ratchet means for permitting the casing to rotate on the sleeve in one direction while holding the casing against rotary movement in the other direction, a nut on the bolt extending into the casing, means for causing the casing to rotate with the nut, said means including a projection on one part and a recess in the other part for receiving the projection and latch means for detachably connecting the casing with the nut.

EARL WILLIAM BOYER.